(12) United States Patent
Saffer

(10) Patent No.: US 8,751,230 B2
(45) Date of Patent: Jun. 10, 2014

(54) METHOD AND DEVICE FOR GENERATING VOCABULARY ENTRY FROM ACOUSTIC DATA

(75) Inventor: Zsolt Saffer, Vienna (AT)

(73) Assignee: Koninklijke Philips N.V., Eindhoven (NL)

( * ) Notice: Subject to any disclaimer, the term of this patent is extended or adjusted under 35 U.S.C. 154(b) by 671 days.

(21) Appl. No.: 12/997,898

(22) PCT Filed: Jun. 17, 2009

(86) PCT No.: PCT/IB2009/052572
§ 371 (c)(1),
(2), (4) Date: Dec. 14, 2010

(87) PCT Pub. No.: WO2009/156903
PCT Pub. Date: Dec. 30, 2009

(65) Prior Publication Data
US 2011/0093259 A1    Apr. 21, 2011

(30) Foreign Application Priority Data
Jun. 27, 2008  (EP) ..................................... 08159166

(51) Int. Cl.
*G10L 15/06* (2013.01)
*G10L 15/00* (2013.01)

(52) U.S. Cl.
USPC ............................. 704/243; 704/235; 704/231

(58) Field of Classification Search
USPC .................................. 704/231, 251, 235, 257
See application file for complete search history.

(56) References Cited

U.S. PATENT DOCUMENTS

| | | | |
|---|---|---|---|
| 6,021,384 A | 2/2000 | Gorin et al. | |
| 6,044,343 A * | 3/2000 | Cong et al. | 704/236 |
| 6,101,468 A * | 8/2000 | Gould et al. | 704/251 |
| 6,389,395 B1 * | 5/2002 | Ringland | 704/254 |
| 6,801,893 B1 | 10/2004 | Backfried et al. | |
| 7,103,533 B2 * | 9/2006 | Lewis et al. | 704/9 |
| 7,181,398 B2 | 2/2007 | Thong et al. | |
| 7,389,228 B2 * | 6/2008 | Rajput et al. | 704/236 |
| 7,698,136 B1 * | 4/2010 | Nguyen et al. | 704/241 |
| 2004/0148167 A1 | 7/2004 | Schimmer et al. | |
| 2007/0124147 A1 * | 5/2007 | Gopinath et al. | 704/257 |

FOREIGN PATENT DOCUMENTS

WO    2005098817 A2    10/2005

OTHER PUBLICATIONS

Bazzi et al: "Modeling Out-of-Vocabulary Words for Robust Speech Recognition"; Laboratory for Computer Science, Massachusets Institute of Technology, 2002, 4 Page Document.
Palmer, D.: "Some Challenges of Developing Fully-Automated Systems for Taking Audio Comprehension Exams"; The Mitre Corporation, Published in Proceedings of the 2000 ANLP/NAACL Workshop on Reading Comprehension Tests As Evaluation for Computer-Based Language Understanding Systems, vol. 6, pp. 6-12.

(Continued)

*Primary Examiner* — Jesse Pullias

(57) ABSTRACT

A method and a device (1) for automatically generating vocabulary entry from input acoustic data (3), comprising a vocabulary entry type-specific acoustic phonetic transcription module (2; T) and a classifier module (6; 6') for the classification of vocabulary entry types on the basis of the phonetic structure, wherein the classification of vocabulary entries is carried out in accordance with a number of predetermined types; and vocabulary entry type-specific phoneme-to-grapheme conversion means (28), to derive the respective vocabulary entries comprising a pair of a phonetic transcription and its grapheme form.

20 Claims, 6 Drawing Sheets

(56) References Cited

OTHER PUBLICATIONS

Scharenborg et al: "A Two-Pass Approach for Handling Out-of-Vocabulary Words in a Large Vocabulary Recognition Task"; Computer Speech and Language, 2007, Vo. 21, No. 1, pp. 206-218.
Zissman et al: "Automatic Language Identification"; Proc. ESCA—NATO Workshop on Multilingual Interoperability in Speech Technology (MIST), Sep. 1999, pp. 1-9.
Mary et al: "Autoassociative Neural Network Models for Language Identification";ICISIP 2004, pp. 317-320.
Benarousse et al: "Preliminary Experiments on Language Identification Using Broadcast News Recordings"; Eurospeech 2001, 4 Page Document.
Galescu et al: "Bi-Directional Conversion Between Graphemes and Phonemes Using a Joint N-Gram Model"; Proceedings of the 4th ISCA Workshop on Speech Synthesis, 2001, 6 Page Document.
Horndasch et al: "Phoneme-To-Grapheme Mapping for Spoken Inquiries to the Semantic Web"; Interspeech 2006, pp. 13-16.
Gallwitz et al: "A Category Based Approach for Recognition of Out-OG-Vocabulary Words"; Fourth International Conference on Spoken Language, ICSLP 1996, vol. 1, pp. 228-231.

* cited by examiner

METHOD AND DEVICE FOR GENERATING VOCABULARY ENTRY FROM ACOUSTIC DATA

FIELD OF INVENTION

The present invention relates to a method and a device for automatically generating vocabular entry from input acoustic data. Such a vocabulary may e.g. be used in speech recognition systems, in speech synthesis systems, or in automatic processing of audio-visual lectures for information retrieval.

BACKGROUND OF INVENTION

Speech recognition and speech synthesis systems apply vocabularies containing words and their pronunciation forms. Both the creation of pronunciation forms and the resulting phoneme sequences are called phonetic transcription. A word together with its phonetic transcription forms a vocabulary entry.

One of the unsolved problems in current speech processing systems is the presence of "out of vocabulary" (OOV) words, that is of words which are not contained in the vocabulary, compare for instance U.S. Pat. No. 7,181,398 B2. The OOV words can be general purpose ones or user-specific pronunciations of known words. Most of the prior art speech recognition systems cannot detect automatically these OOV words; instead thereof, they make a recognition error. Normally in such systems, a correctionist or the user him-/herself identifies these OOV words. After the identification the system can determine the corresponding input acoustic data.

In another embodiment the user has the opportunity to add new words to the vocabulary by simple spelling them.

In all cases the prior systems can produce vocabulary entries automatically only for standard words, namely for words fitting to the morphology of the actual language, but they cannot produce automatically vocabulary entries for special words having a morphology differing from the actually used language. In particular, such special words are foreign words, family names with foreign origin or abbreviations.

This makes both the process of correcting OOV words and the process of adding new words to a vocabulary cumbersome and time-consuming. Additionally, due to the lack of the capability of automatic vocabulary entry generation for special words, an automatic vocabulary generation from any public accessible acoustic data is also not possible.

SUMMARY OF INVENTION

Accordingly, it is an object of the invention to overcome the above mentioned problems, and to provide a method as well as a device which can produce automatically vocabulary entries from specified input acoustic data for any kind of words including special words.

According to a first aspect of the invention, there is provided a method for automatically generating vocabulary entry from input acoustic data, said method comprising the steps of:

performing a vocabulary entry type-specific acoustic phonetic transcription and a classification of vocabulary entry types on the basis of the phonetic structure, wherein the classification of vocabulary entries is carried out in accordance with a number of predetermined types; and performing a vocabulary entry type-specific phoneme-to-grapheme conversion, to derive the respective vocabulary entries comprising a pair of a phonetic transcription and its grapheme form.

According to a second aspect of the invention, there is provided a device for automatically generating vocabulary entry from input acoustic data and comprising vocabulary entry type classifier means and vocabulary entry type-specific acoustic phonetic transcription means, vocabulary entry compositor means, wherein the vocabulary entry type classifier means are arranged to classify the vocabulary entries in accordance with a number of predetermined types, and wherein the vocabulary entry compositor means comprise vocabulary entry type-specific statistical phoneme-to-grapheme converter means.

Furthermore, according to a third aspect, the invention provides a computer program product that can be loaded directly into a memory of a computer, and that comprises sections of a software code for performing the method according to the invention when the computer program is run on the computer.

According to the invention, it is possible to automatically generate vocabulary entry from specified input acoustic data. The vocabulary entry is a pair of a phonetic transcription and its corresponding grapheme form (word). After automatic generation, the vocabulary entry can immediately be added to the vocabulary. The method is generic, i.e. it is applicable for generating any kind of vocabulary entries. The particular advantage is that it enables also the generation of special vocabulary entries having phonetic transcriptions different from the language morphology. Such entries are e.g. foreign words (foreign language words), family names with foreign origin or abbreviations.

To achieve the automatization of the vocabulary entry generation, in short, the following features are provided:

Vocabulary entry type specific acoustic phonetic transcription

Automatic classification of vocabulary entry types

Vocabulary entry type specific phoneme-to-grapheme conversion (inverse phonetic transcription)

In particular, there is provided a morphology (phonetic structure) based automatic classification of the vocabulary types. The classification method may be a score and phonetic distance measures-based method, or may be based on a specific neural network-based language identification. However, any other known realization of phonetic structure based classification may be performed, too.

Preferably, the following vocabulary entry types are introduced:

vocabulary entry fitting to the language morphology (normal word or family name with non-foreign origin)

vocabulary entry fitting to the morphology of a foreign language of a specified set of languages (e.g. foreign word or family name with foreign origin)

vocabulary entry fitting to the morphology of none of the supported languages and normally pronounced, i.e. abbreviations (e.g. like "Philips")

vocabulary entry fitting to the morphology of none of the supported languages and pronounced by spelling, i.e. abbreviations (e.g. like "IBM")

The vocabulary entry type of the specified input acoustic data is decided by a classifier and the acoustic phonetic transcription is extracted from the supplied input acoustic data.

As to the vocabulary entry type classification, it is particularly advantageous if the classification of vocabulary entries is carried out together with the acoustic phonetic transcription in a combined step. In connection therewith, it is preferred that the vocabulary entry types are hypothesized during acoustic phonetic transcription, with separate acoustic phonetic transcription being applied for each hypothesized vocabulary entry type.

On the other hand, as already mentioned above, it is also useful if for automatic vocabulary entry type classification, a neural network based language identification is applied. Here, it is also preferable if at first, the neural network based classification is carried out, whereafter the acoustic phonetic transcription is performed on the basis of the vocabulary entry type information.

As to the preferred four vocabulary entry types mentioned above, it is also preferred that a standard acoustic model is applied together with syllable language models with respect to vocabulary entries which fit to a language morphology, whereas a high resolution acoustic model is applied with respect to normal abbreviation type and a spelling acoustic model is applied with respect to spelled abbreviations.

As far as the vocabulary type classifier is concerned, it is particularly advantageous if the vocabulary entry type classifier means comprise gate means for respective vocabulary entry types, said gate means being arranged to output a respective vocabulary entry type information together with the phonetic transcription.

The acoustic phonetic transcription means may comprise syllable language model means, and in particular standard acoustic model means, high resolution acoustic model means, and spelling acoustic model means.

Here, and in the case that for classification, neural network means are provided which are arranged to output the vocabulary entry type, the classifier means comprise the neural network means arranged to output probability information for every predetermined vocabulary entry type together with the input acoustic data; said vocabulary entry type information, together with the input acoustic data, is supplied to the vocabulary entry type-specific acoustic phonetic transcription means which are arranged to output the vocabulary entry type information together with the phonetic transcription. Furthermore, it is particularly advantageous if the acoustic phonetic transcription means comprise an acoustic model selector associated with the given acoustic model means as well as a syllable language model selector associated with the given syllable language model means, both selectors being connected to the vocabulary entry type information.

From the above it may be seen that there are two preferred main embodiments of the invention, with different forms of vocabulary entry type classification. In the first embodiment, vocabulary entry type classification and acoustic phonetic transcription are performed in a more or less single, combined step. The acoustic phonetic transcription is extracted from the specified input acoustic data by applying phoneme recognition. Different syllable language models model the morphology information of the supported languages. Additionally, to recognize the phoneme sequences of the abbreviations, different acoustic models are necessary. By this method, the vocabulary entry type specific acoustic phonetic transcription is performed by setting different resources for the phoneme recognition. The vocabulary entry type specific acoustic phonetic transcriptions are performed for every hypothesized vocabulary entry types on parallel way. The thus resulting phoneme sequences are hypothesized phonetic transcriptions, i.e. candidates. A maximum two-stage classification process decides the vocabulary entry type, and afterwards, the corresponding candidate becomes the phonetic transcription of the specified input acoustic data. In the first stage, an acoustic probability based decision is made to detect the abbreviations pronounced by spelling. If it turns out that the current vocabulary entry has another type, then the second stage is also applied. Here, a combined phonetic distance and probability-based decision may be made on the remaining vocabulary entry type hypotheses. Such phonetic distance is e.g. the number of different phonemes between the phoneme sequences divided by the average number of phonemes in those phoneme sequences (normalized phonetic distance).

In the second main embodiment of the invention, type classification and acoustic phonetic transcription are performed in a sequential way. In a first step, a neural network-based classifier is applied to decide the vocabulary entry type of the specified input acoustic data. Afterwards, this vocabulary entry type information is used to set the resources of a phoneme recognizer to perform only the relevant vocabulary entry type specific acoustic phonetic transcription.

The abbreviations pronounced by spelling vocabulary entry type have unique phoneme-to-grapheme assignment, which is utilized to get the abbreviation word from the phonetic transcription. To perform the phoneme-to-grapheme conversion for the other vocabulary entry types a standard statistical approach, e.g. a joint N-gram based method may be applied, for instance the method of L. Galescu, J. Allen (2001), "Bi-directional Conversation Between Graphemes and Phonemes Using a Joint N-gram model", Proc. $4^{th}$ ISCA Workshop on Speech Synthesis, Pitlochry, Scotland, 2001. This method uses vocabulary entry type specific inverse phonetic transcription resources. For training such a resource, a specific preliminary vocabulary is used, which is built up from vocabulary entries having a type corresponding to the type of the required resource.

BRIEF DESCRIPTION OF THE DRAWINGS

The above and further aspects of the invention are apparent from and will be elucidated with reference to the embodiments described hereinafter by reference to the drawings, of course without the intention to limit the invention to these preferred embodiments.

In the drawings.

DETAILED DESCRIPTION OF PREFERRED EMBODIMENTS OF THE INVENTION

Figure 1:
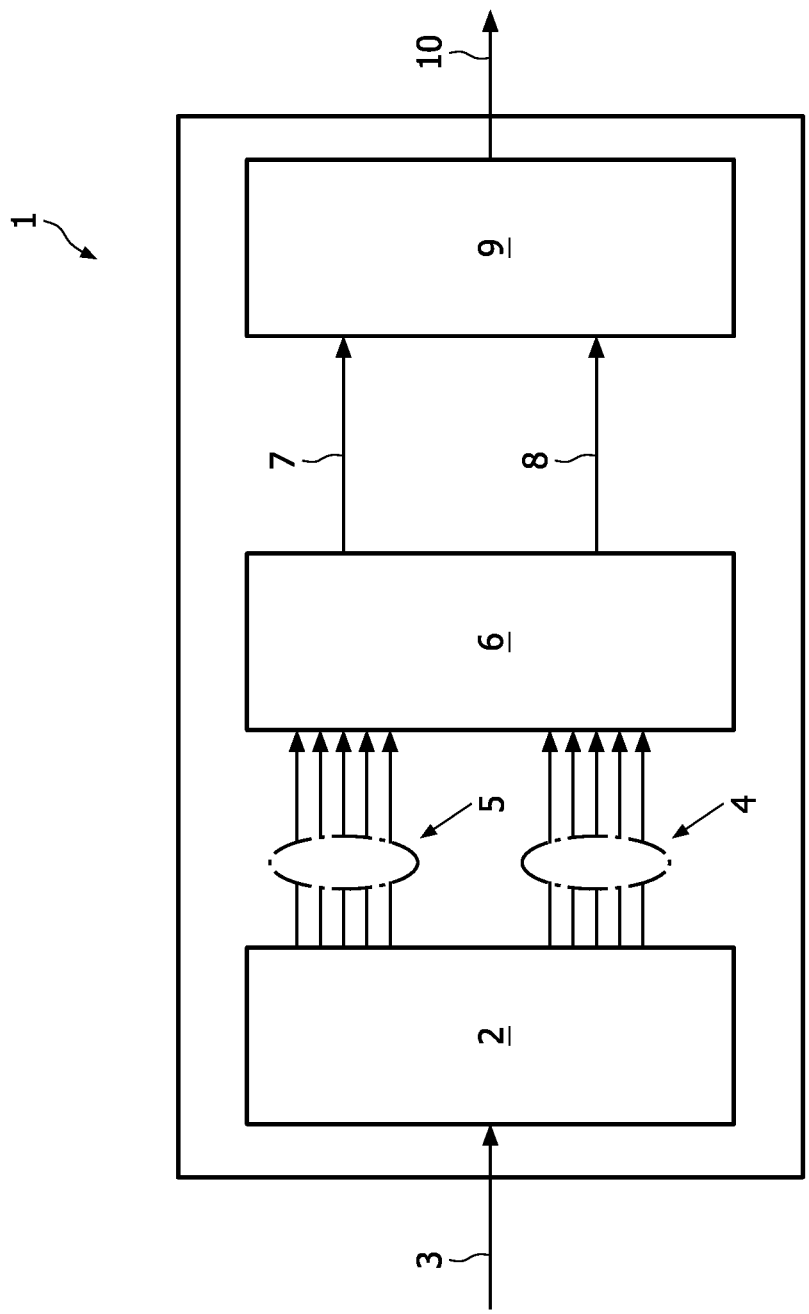
FIG. 1 is a schematic diagram showing a first embodiment of an automatic vocabulary entry generation according to the invention in the main processing blocks.

Before describing the preferred embodiments of the present invention on the basis of the drawings, it seems suitable to state that in the drawings, by rectangular blocks, functional blocks of the respective structures of the components of the invention are shown whereas with oval units in full lines, respective resources used for the specific functions are represented; further, with oval units in interrupted lines, data belonging together (alternatively realized as composites) are shown. Then, data flows are illustrated in the drawings by arrows.

For a further general introduction into the present technique, it should be reminded that a vocabulary entry is a pair of a phonetic transcription and its corresponding grapheme form (word). An automatic vocabulary entry generation from specified input acoustic data has a special importance due to its added value in many speech processing application scenarios. Such application scenarios are e.g. adding OOV words or new words to a system, or set up a user-specific pronunciation lexicon. However, in the past, the problem of automatic vocabulary entry generation has been only partly solved. Handling of special items, like foreign words, family names with foreign origin, or abbreviations cannot be performed on automatic way by former systems. This is a considerable inconvenience when using such systems, and it prohibits the realization of new application scenarios, like automatic pronunciation lexicon generation.

The goal of the present invention was to propose a technique with which it is possible to automatically generate any kind of vocabulary entry from specified input acoustic data. A special task of the technique is to enable also the automatic generation of special vocabulary entries. In general, the phonetic transcriptions of such entries differ from the language morphology, i.e. from the inherent phonetic structure of the language.

The present technique can be considered to comprise three main steps:

Vocabulary entry type specific acoustic phonetic transcription;
automatic classification of vocabulary entry types; and
vocabulary entry composition.

The processing blocks corresponding to these main steps are illustrated in FIG. 1.

More in detail, FIG. 1 schematically shows a device 1 comprising in a first block vocabulary entry type-specific acoustic phonetic transcription means 2 to which sound data are supplied at 3. At the output of the acoustic phonetic transcription means 2, phoneme sequences shown at 4 and scores shown at 5 are obtained which are supplied to vocabulary entry type-specifier means 6, the second main block of the present device 1. Here, the types of the vocabulary entries are fixed, and corresponding vocabulary entry type information 7 is supplied from the output of the classifier means 6 to vocabulary entry compositor means 9 together with phonetic transcriptions 8. At the output of the vocabulary entry compositor means 9, the respective vocabulary entries are obtained at 10.

According to the present invention, the following vocabulary entry types are defined:

Type "normal": vocabulary entry fitting to the phonetic structure of the current language (normal word or family name with non-foreign origin)—type "N"

Type "i-th supported foreign": vocabulary entry fitting to the phonetic structure of an i-th foreign language of a specified set (i=1 . . . n) of supported languages (e.g. foreign word or family name with foreign origin)—type "Fi" or "F1" . . . "Fn"

Type "normal abbreviation": vocabulary entry fitting to the phonetic structure of none of the supported languages, but normally pronounced (like "Philips")-type "AN"

Type "spelled abbreviation": vocabulary entry fitting to the phonetic structure of none of the supported languages, and pronounced by spelling (like "IBM")-type "AS"

It should be noted that some abbreviations can accidentally fit to the phonetic structure of the current language, so they belong to the type "normal".

Now, with particular reference to the acoustic phonetic transcription block 2 in FIG. 1, it is a well-known technique to get the phonetic transcription from the specified input acoustic data (the sound at input 3) by applying standard phoneme recognition. For details about standard phoneme recognition it may be referred e.g. to K. F. Lee, H. W. Hon (1989), "Speaker-Independent Phone Recognition Using Hidden Markov Models", Proc. IEEE Trans. ASSP, Vol. 37, No. 11, pp 1641-1648. This technique is called acoustic phonetic transcription.

In standard phoneme recognition, phoneme language modeling is used to improve the phone accuracy. However, the phoneme language modeling has only very restricted search space limitation capability. This implies that only moderate improvement can be reached in the phone accuracy on this way (see again the article of K. F. Lee, H. W. Hon (1989) mentioned above). On the other hand, for the same reasons, the phoneme graph phone accuracy is much higher, i.e. the phoneme graph of the phoneme recognizer includes the right phoneme sequence with high probability.

Therefore, it is preferred to apply syllable language modeling instead of phoneme language modeling due to its much stronger search space limitation capability. Thus, the phonetic structure of the language is stronger utilized, which results higher phone accuracy.

In the syllable language modeling, the syllables are represented as phoneme sequences to enable applying it in the phoneme recognizer.

When starting the automatic generation of vocabulary entry from input acoustic data, the vocabulary entry type of the content of the specified input acoustic data is unknown. Therefore, each vocabulary entry type is hypothesized. The acoustic phonetic transcriptions of the different vocabulary entry types require different resources, so the method applies separate acoustic phonetic transcription for each hypothesized vocabulary entry type. Thus, the phoneme sequence outputs 4.N, 4.F1 . . . 4.Fn, 4.AN, 4.AS of parallel running phoneme recognizers 11, 12.1 . . . 12.$n$, 13, 14 (N, F1 . . . Fn, AN, AS) are hypothesized phonetic transcriptions, i.e. candidates for the valid phonetic transcription of the specified input acoustic data. The phoneme recognizers 11-14 are denoted also by AS, AN, N, F1, . . . Fn according to the corresponding hypothesized vocabulary entry types.

After generating the candidates, these candidates (phoneme sequences) and the scores of all the phoneme recognizers are put to the output 4 and 5, respectively. For the cases of hypothesizing the "normal abbreviation" AN and "spelled abbreviation" AS, the score which is used is the acoustic one, compare lines 5.AN, 5.AS in FIG. 2. For the other cases (N, F1 . . . Fn), the score is the total score, i.e. the sum of the acoustic and language modeling one, compare lines 5.N, 5.F1 . . . 5.Fn in FIG. 2. The score is a well-known term and used in the area of the speech recognition. It is the negative logarithm of the probability. Hence the acoustic score is the negative logarithm of the acoustic probability of the specified input acoustic data. Similarly, the language model score is the accumulated negative logarithm of language model probabilities of the given units, in this case syllables.

Figure 2:
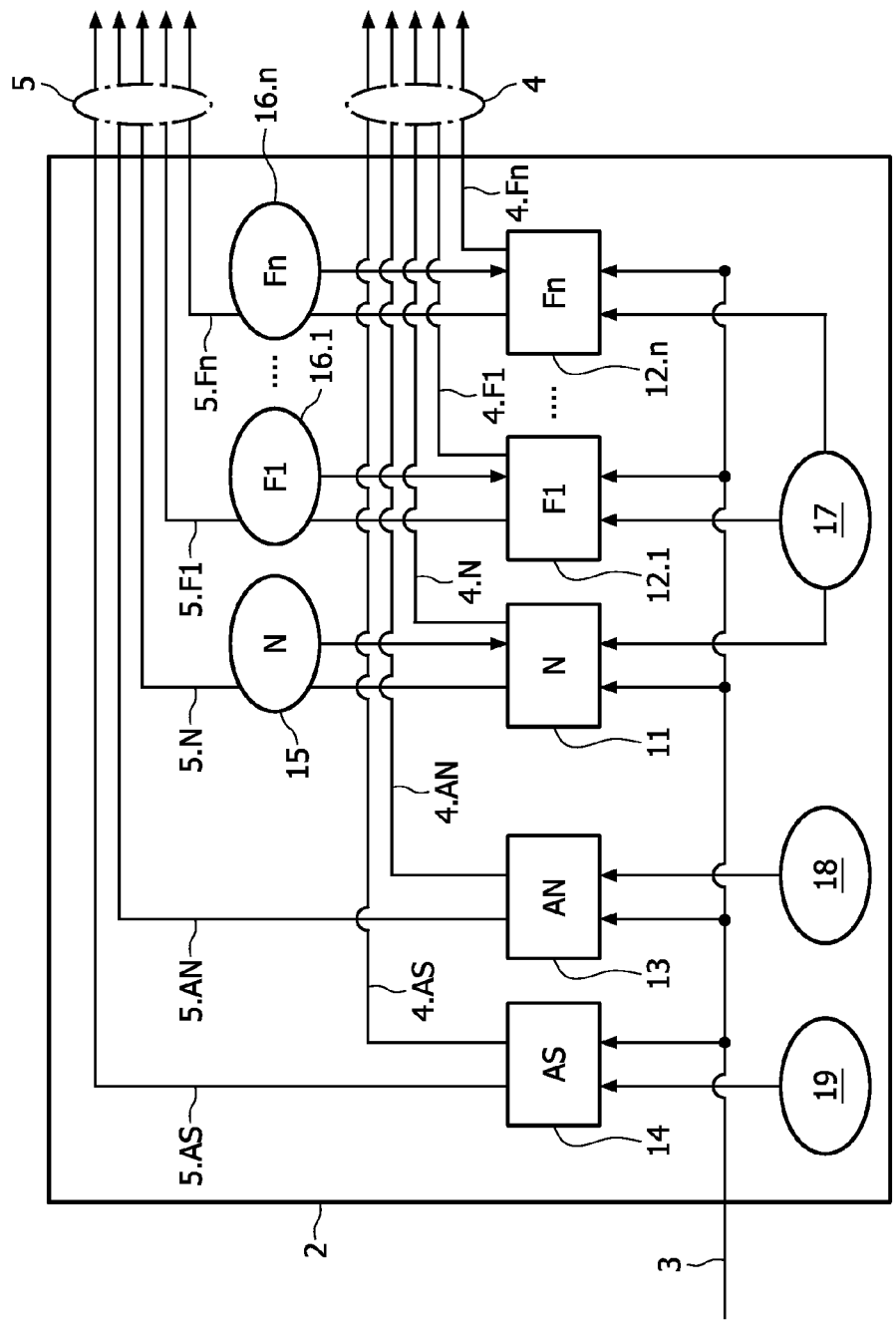
FIG. 2 is a block diagram illustrating the structure of preferred vocabulary entry type specific acoustic phonetic transcription means according to the first embodiment of the invention.

Normally, to perform the acoustic phonetic transcription, the phoneme recognizer 11-14 needs an acoustic resource modeling the acoustic units (like phones)—a standard acoustic model, in addition to statistical language models, cf. the syllable language models 15, 16.1 ... 16n in FIG. 2 modeling the phonetic structure of the current language—the syllable language model. This is the case for the vocabulary entry type "normal", cf. the standard acoustic model 17 in FIG. 2. Similarly, the phoneme recognition for vocabulary entry types "i-th supported foreign" uses the same acoustic resource 17. However, it applies the i-th supported foreign language specific syllable language model 16.1 ... 16n, as shown in FIG. 2.

In general, the normally pronounced abbreviations AN do not fit to the phonetic structure of the current language. Therefore, the phoneme recognition for the hypothesized vocabulary entry type "normal abbreviation", AN, uses only an acoustic resource, but no syllable language model. The lack of applying any language model implies degradation of the phone accuracy. To compensate it, a high resolution acoustic model 18 is applied.

The most special case is the "spelled abbreviation", AS-type. The task of recognizing spelled words significantly differs from the recognition of normal pronunciations, see for instance WO 2005/098817. Hence, the spell recognizer 14 has to be optimized for the sequence of pronounced single characters. Usually, this is achieved by applying acoustic modeling on the spelled phones, which results in a spelling acoustic model 19. Therefore, the phoneme recognition for the hypothesized "spelled abbreviation" vocabulary entry AS uses such a spelling acoustic model 19, and similarly to the case of "normal abbreviation" AN, no syllable language model is used. This is because the "spelled abbreviation" also does not fit to the phonetic structure of the current language. However, the special spelling acoustic model ensures high phone accuracy, hence in this case there is no need to apply any compensation technique due to the effect of missing language model, like in case of "normal abbreviation".

All these phoneme recognizer settings are summarized in table 1 below:

TABLE 1

| Vocabulary entry type | Used resources by phoneme recognizer |
| --- | --- |
| "normal" ("N") | standard acoustic model 17; syllable language model 15 modeling the phonetic structure of the current language (N syllable language model) |
| "i-th supported foreign", i = 1 ... n ("Fi") | standard acoustic model 17; syllable language model 16.1 ... 16.n modeling the phonetic structure of the i-th supported foreign language (Fi syllable language model) |
| "normal abbreviation" ("AN") | high resolution acoustic model 18; no syllable language model |
| "spelled abbreviation" ("AS") | spelling acoustic model 19; no syllable language model |

Figure 3:
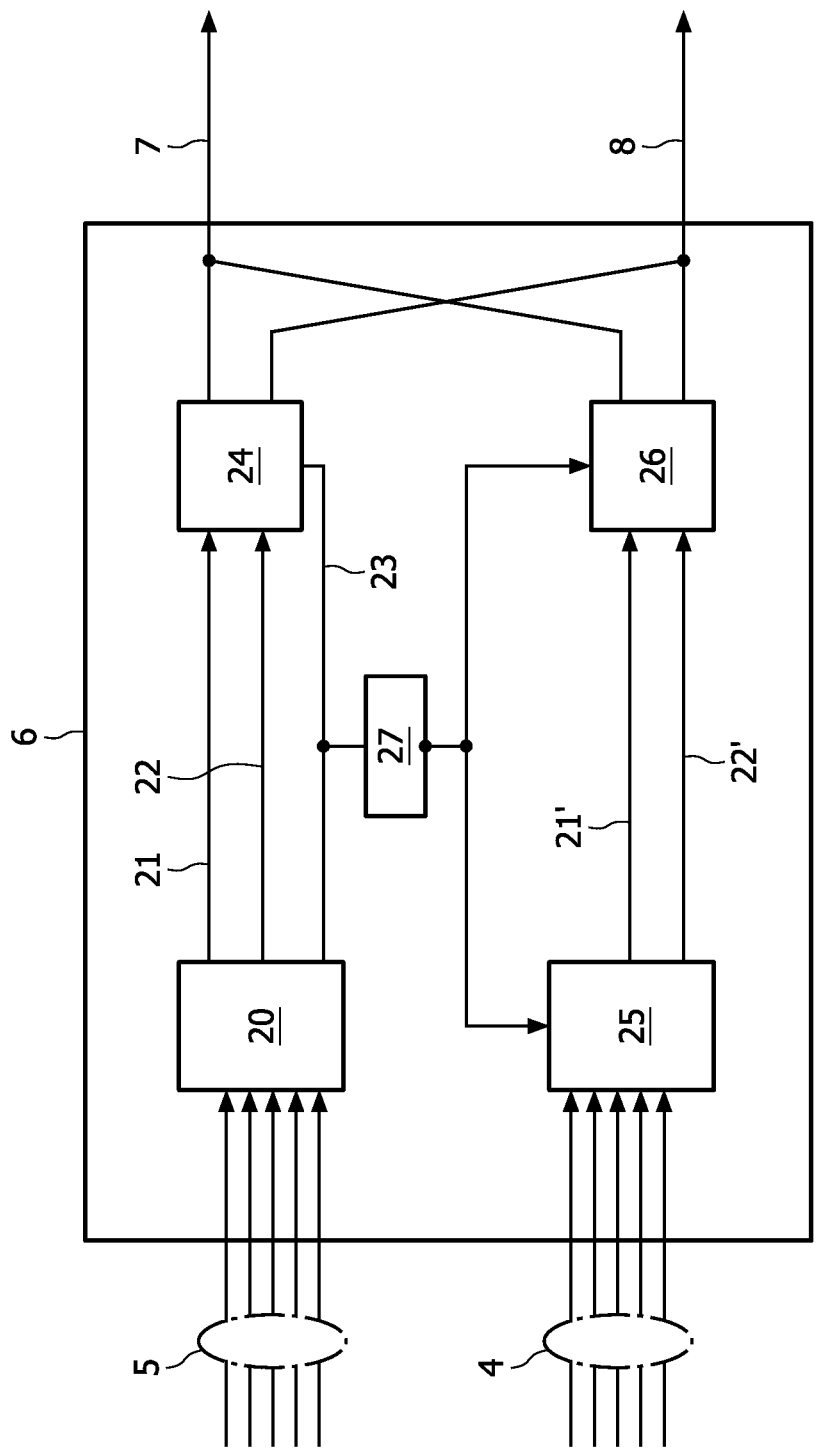
FIG. 3 is a block diagram illustrating preferred vocabulary entry type classifier means of the first embodiment of the invention.

The automatic classification of the vocabulary entry types is shown then more in detail in FIG. 3. As to the classification process, it is apparent that the classifier means 6 comprise a two-stage classifier 6 which decides the type of the actual vocabulary entry and selects the proper phonetic transcription among the candidates.

In particular, a first stage 20 decides whether the vocabulary entry type of the specified input acoustic data (at 4, 5) is "spelled abbreviation" AS or not. The outputs of the first stage 20 are then a vocabulary entry type information 21, the phoneme sequence 22 and spelled abbreviation information 23. If it is decided that the vocabulary entry type is "spelled abbreviation", then the vocabulary entry type information 23 specifies the selected vocabulary entry type, i.e. it is "spelled abbreviation", and the phoneme sequence output 22 is the selected phoneme sequence, i.e. it is the output 5.AS of the phoneme recognizer 14 (FIG. 2) hypothesizing the "spelled abbreviation". These outputs are feed into a first gate 24. The spelled abbreviation information is a Boolean term representing the selected abbreviation case (AS). This is used to trigger a second stage 25 and both the first gate 24 and a second gate 26.

If spelled abbreviation information 23 is "true", then it enables the first gate 24, i.e. the output vocabulary entry type information 21 and the phoneme sequence 22 of the first stage 20 become the output 7, 8 of the whole classifier 6. Additionally, the second stage 25 and the second gate 26 are disabled, see the negation member 27 in FIG. 3.

In the other case, if the spelled abbreviation information 23 is "false", then the second stage 25 and the second gate 26 are enabled, i.e. the output vocabulary entry type information 21' and phoneme sequence 22' of the second stage 25 become the output 7, 8 of the whole classifier 6. Additionally, in this case, the first gate 24 is disabled.

If the second stage 25 is enabled, i.e. the vocabulary entry type is decided not being "spelled abbreviation", the second stage 25 makes a decision on the remaining vocabulary entry types. Accordingly, the decided vocabulary entry type N, Fi or AN and the corresponding phoneme sequence are set to the output 21', 22', or 7 and 8, respectively, of the second stage 25, that is of the classifier 6.

Even more in detail, the first stage 20 compares the acoustic scores (inputted at 5) of the phoneme recognizers 11-14 hypothesizing the "normal abbreviation" and the "spelled abbreviation". The less score represents the more probable case and therefore is the basis for the decision whether the vocabulary entry type is "spelled abbreviation" or not. Here, acoustic modeling is essential, or at least advantageous, i.e. in case of "spelled abbreviation", any phoneme recognition with non-spelling acoustic model produces worse score, and in case of normal pronunciation the phoneme recognition with spelling acoustic model issues the worse score. This is due to the improper spelling phoneme models applied to recognition of normal pronunciation. It follows that it is sufficient to compare the acoustic score of the phoneme recognizer 14 hypothesizing the "spelled abbreviation" with the score of only one phoneme recognizer hypothesizing any case with normal pronunciation. To provide a fair comparison, the case of hypothesizing "normal abbreviation" is selected, because in this case the corresponding recognizer 13 also does not use a syllable language model, i.e. it also does not incorporate a language model score in the resulting score.

The second stage 25 applies a phonetic distance measure on the phonetic transcription candidates to decide whether the input speech part has the assumed underlying phonetic structure or not. The phonetic distance measure is e.g. the normalized phonetic distance, i.e. the number of different phonemes between the phoneme sequences under comparison divided by the average number of phonemes in those phoneme sequences, as known per se.

The advantage of utilizing the phonetic distance measure is based on the following observation:

If the input speech part has an underlying morphology, then the syllable language model representing this phonetic structure information does not mean significant limitation on the allowed phoneme sequences. However, if the input speech part has no underlying phonetic structure (sequence of independent phonemes), then applying a syllable language model representing assumed phonetic structure information causes significant bias in the output phoneme sequence 22' in comparison to the correct one.

Therefore, if the phonetic sequences generated by phoneme recognition with and without syllable language model representing the underlying phonetic structure are phonetically similar (i.e. having small phonetic distance), then the input speech part has an underlying morphology. On the other hand, if the phonetic sequences 4 generated by phoneme recognition with and without syllable language model representing assumed phonetic structure are phonetically far from each other (i.e. have a large phonetic distance), then either the input speech part has no underlying morphology, or the acoustic conditions are adverse, i.e. are not normal. Therefore, under normal acoustic conditions, a phonetic distance measure is appropriate to detect whether the input speech part has the assumed underlying phonetic structure or not.

As mentioned, the second stage 25 applies a phonetic distance measure on the phonetic transcription candidates (input 4) to decide whether the vocabulary entry type is one of the cases having underlying phonetic structure or not. The applied phonetic distance measure can be the normalized phonetic distance, or any other appropriate measure.

The phonetic distance is measured pairwise between the phonetic sequence of the hypothesized "normal abbreviation" case AN and the phonetic sequence of each of the hypothesized "normal" and "i-th supported foreign" cases N, Fi. Each of the measured phonetic distance is compared with a predefined threshold. These thresholds are specific for each of the hypothesized "normal" and "i-th supported foreign" cases, and depend on the used phonetic distance measure as well as on the applied phoneme recognizer systems. Therefore, they are to be tuned on the concrete arrangement.

If the phonetic distance for at least one case falls below its specified threshold, then the specified input is not "normal abbreviation". In this case the hypothesized case with the best score among the hypothesized cases from the "normal" and "i-th supported foreign" having a phonetic distance below the associated threshold is declared as vocabulary entry type. It has the phonetic structure fitting most probably to the specified input. Otherwise, it means that none of the hypothesized morphologies fits to the specified input, and hence the "normal abbreviation" is declared as vocabulary entry type.

A similar score-based method for spoken language identification task from specified speech input is evaluated in L. Benarousse, E. Geoffrois, "Preliminary experiments on language identification using broadcast news recordings", EUROSPEECH 2001-Scandinavia. In that task, however, no abbreviation cases are handled. Another difference is that in those experiments, phoneme language models are used instead of syllable language models as phonotactic model.

Figure 4:
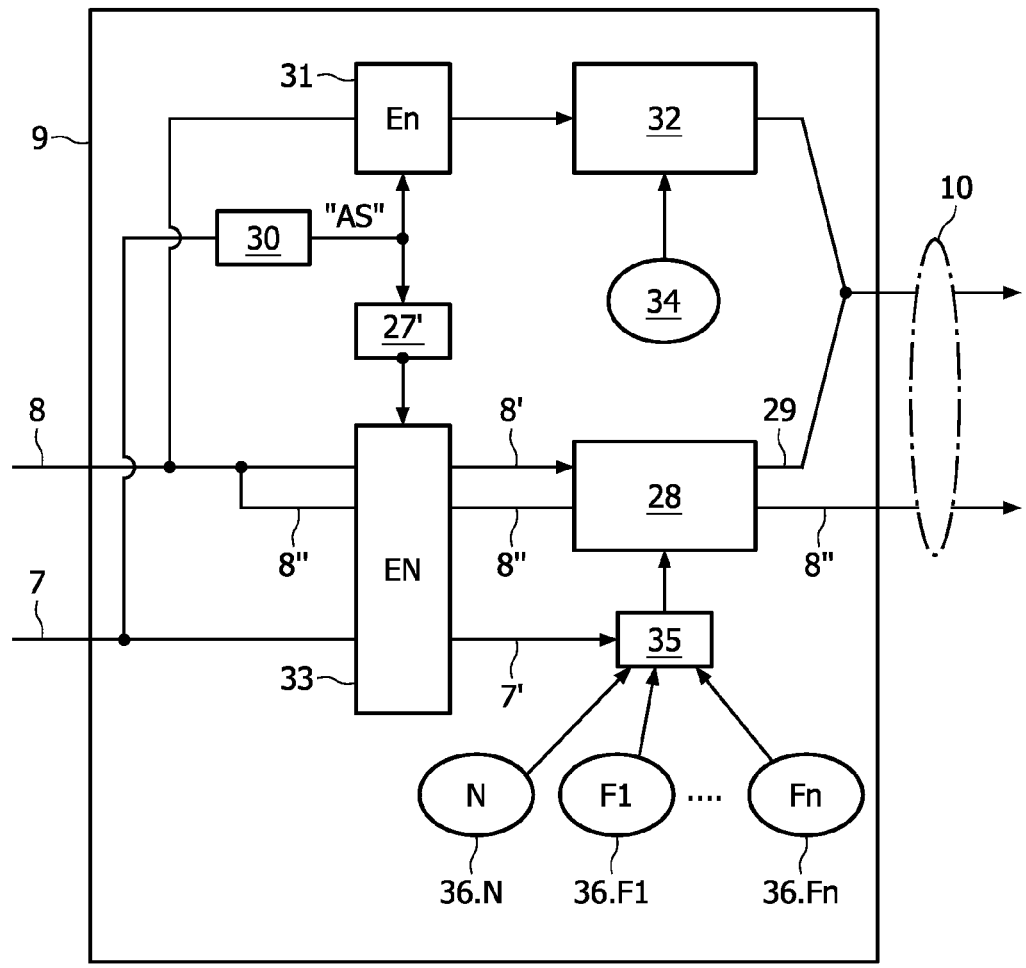
FIG. 4 shows the structure of preferred vocabulary entry compositor means which may be used for the first and a second main embodiment of the invention.
Figure 5:
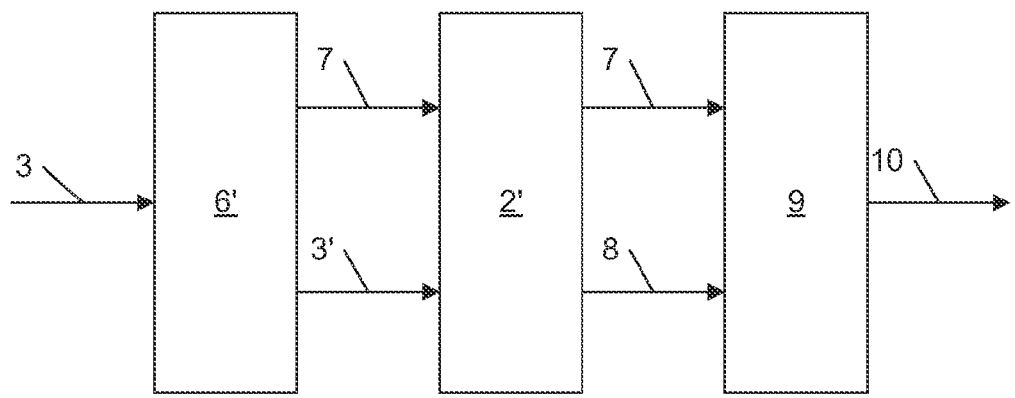
FIG. 5 is a schematic diagram showing a second embodiment of an automatic vocabulary entry generation according to the present invention and its main processing blocks, similarly to the illustration in FIG. 1.
Figure 6:
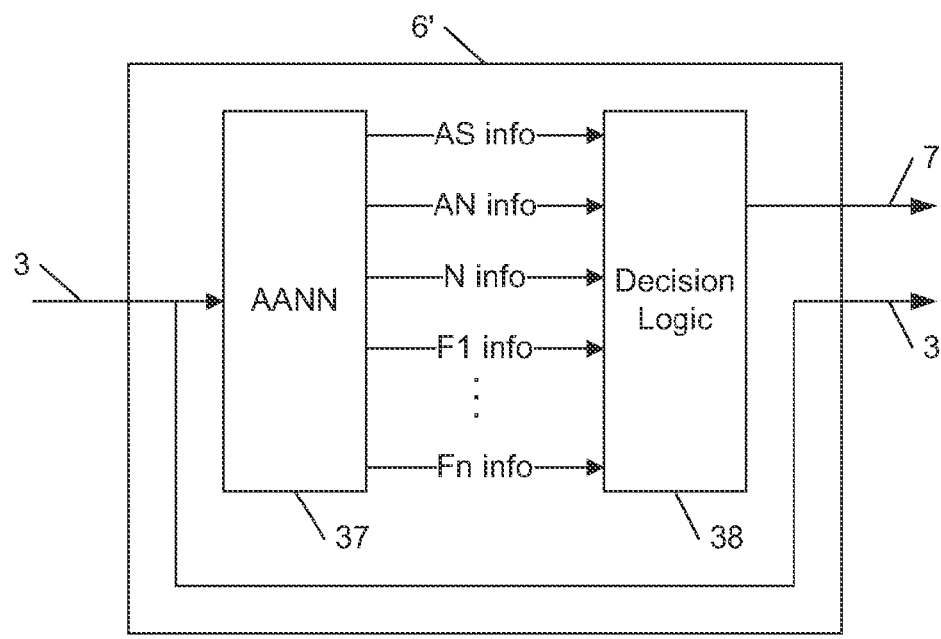
FIG. 6 is a block diagram illustrating a neural network based vocabulary entry type classifier belonging to the second embodiment of the invention.
Figure 7:
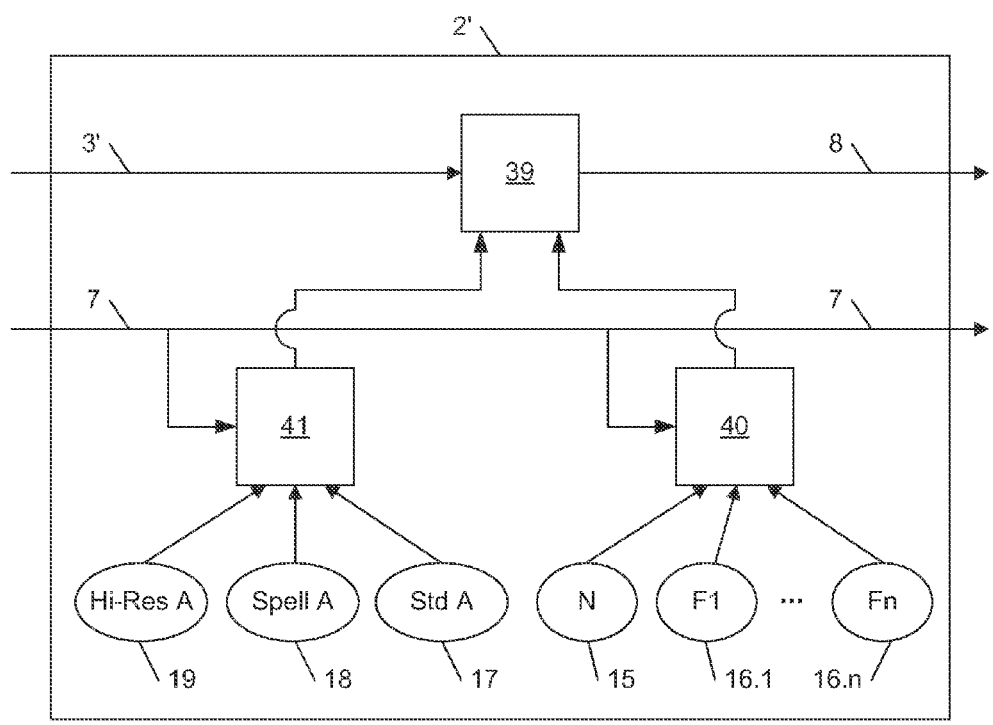
FIG. 7 is a schematic diagram showing the vocabulary entry type-specific acoustic phonetic transcriber according to the second embodiment of the present invention.

Before describing the second preferred embodiment with reference to FIGS. 5, 6 and 7, which essentially correspond to FIGS. 1, 2 and 3, the setting up of the final vocabulary entry output 10 in vocabulary entry compositor means 9—which are common to both embodiments—shall be described now more in detail with reference to FIG. 4.

An essential part of the vocabulary entry compositor 9 is a vocabulary entry type-specific statistical phoneme-to-grapheme conversion, see converter means 28 in FIG. 4, which provides the graphemic form of the entry, i.e. the word itself, at output 29.

The input of the vocabulary entry compositor 9 is composed of the vocabulary entry type information 7 and the phonetic transcription 8. Both inputs 7,8 are used for the phoneme-to-grapheme conversion, cf. lines 8' (phonetic transcription input) and 7' (vocabulary entry type information) in FIG. 4. Additionally, the phonetic transcription is also directly set to the output as part of the output vocabulary entry, cf. line 8" in FIG. 4.

From the vocabulary entry type information 7, the spelled abbreviation information (AS) is extracted by an extractor 30.

If the spelled abbreviation information is "true", i.e. the vocabulary entry type is "spelled abbreviation", then a first gate 31 of the compositor 9 is enabled and the phonetic transcription 8 is switched through into a unique phoneme-to-grapheme assigner 32. Additionally, a second gate 33 is disabled through a negation member 27'.

In this case there is a unique phoneme-grapheme mapping, so the corresponding graphemic form can be read out directly from a look-up table 34.

If the spelled abbreviation information is "false", i.e. there is the case of any of the other vocabulary entry types, then the second gate 33 is enabled and the phonetic transcription 8 and the vocabulary entry type information 7 get through into the phoneme-to-grapheme converter 28, and into a selector 35, respectively. Furthermore, the first gate 31 is disabled.

The vocabulary entry type specific statistical phoneme-to-grapheme converter 28 provides the graphemic form by using different inverse phonetic transcription resources 36 (36.N, 36.Fi . . . 36.Fn) for each vocabulary entry type. Again, N, F1, . . . Fn denote these vocabulary entry types. The phoneme-to-grapheme and grapheme-to-phoneme relations for the "normal abbreviation" are the same as that ones for the "normal" vocabulary entry type. As a consequence, the same resource 36.N is used for them.

The selector 35 uses the vocabulary entry type information input 7' to order the right inverse phonetic transcription resource 36 to the statistical phoneme-to-grapheme converter 28.

For the statistical phoneme-to-grapheme conversion, besides the standard method of L. Galescu, J. Allen (2001), "Bi-directional Conversation Between Graphemes and Phonemes Using a Joint N-gram model", Proc. $4^{th}$ ISCA Workshop on Speech Synthesis, Pitlochry, Scotland, 2001, also other ones can be applied, like the one described in A. Horndasch, E. Nöth, A. Batliner, V. Warnke (2006), "Phoneme-to-Grapheme Mapping for Spoken Inquiries to the Semantic Web", INTERSPEECH 2006-ICSLP.

The statistical phoneme-to-grapheme converter 28 uses a statistical resource 36 which is trained for each vocabulary entry type. This training uses as phonetic transcription for each resource 36 the output of the vocabulary entry type specific acoustic phonetic transcription instead of corresponding canonical lexicons. In this case the statistical phoneme-to-grapheme converter 28 can adjust to typical errors produced by the phoneme recognizer 11-14, which improves the accuracy of the phoneme-to-grapheme conversion, as it is pointed out in a similar arrangement presented in the article of A. Horndasch, E. Nöth, A. Batliner, V. Warnke (2006) mentioned above.

Referring in particular to FIGS. 5 to 7 now, the second embodiment with respect to vocabulary entry type classification and specific acoustic phonetic transcription will be described now.

Also this second embodiment comprises three main steps:

Automatic (neural network based) classification of vocabulary entry types

Vocabulary entry type specific acoustic phonetic transcription

Vocabulary Entry Composition

As mentioned above, the third step is the same for both representative embodiments. The processing blocks of the second embodiment are illustrated in FIG. 5.

From this FIG. 5, it may be seen that device 1 comprises neural network-based vocabulary entry type classifier means 6', now ahead of vocabulary entry type-specific acoustic phonetic transcription means 2'. The sound input (line 3) is supplied to the classifier 6' as well as (cf. line 3') to the acoustic phonetic transcriber 2'. The vocabulary entry type information 7 as derived by classifier 6' is outputted to the transcriber 2' and, further, to the vocabulary entry compositor 9 which, furthermore, is supplied with the phonetic transcription 8 as obtained in the acoustic phonetic transcription step, block 2' in FIG. 5.

According to FIGS. 5 and 6, a neural network based language identification system is applied to distinguish among the "normal", "i-th supported foreign" and any of the "normal abbreviation" or "spelled abbreviation" vocabulary entry types. This system learns the phonemic structure of the possible language origins during a training process. During the training process, input sound utterances corresponding to the allowed vocabulary entry types are fed to the system. The input sound utterances corresponding to the "normal abbreviation" or "spelled abbreviation" vocabulary entry types are sequences consisting of random generated phonemes which are pronounced either normally or spelled, respectively. Here, this independency of the phonemes represents the phonemic structure of the "normal abbreviation" and "spelled abbreviation" vocabulary entries. On this way special "artificial random language" origins are associated to these "normal abbreviation" and "spelled abbreviation" vocabulary entry types.

In this neural network based language identification system, an auto-associative neural network (AANN) 37 (cf. FIG. 6) is used. Feature vectors are extracted from the specified input acoustic data (sound 3), and they are fed into the applied neural network 37. The AANN models are feed forward neural networks performing an identity mapping of input space. After training, the system can be used to identify the language origins of the specified input acoustic data.

The output of the neural network 37 consists of probability information (AS info, AN info, N info, F1 info ... Fn info) for every allowed vocabulary entry types which are used by a decision logic 38 to determine the final vocabulary entry type, see FIG. 6.

A detailed description of such an AANN neural network based language identification system can be found in Leena Mary, and B. Yegnanarayana, "Autoassociative Neural Network Models for Language Identification", ICISIP 2004.

Thereafter, in a separate step, acoustic phonetic transcription of the specified input acoustic data is performed by the vocabulary entry type specific acoustic phonetic transcriber 2', see FIG. 7. The vocabulary entry type output 7 of the classifier 6' is used to set the syllable language model resources 15, 16.1 ... 16.n and acoustic model resources 17, 18, 19 of a phoneme recognizer 39 accordingly, as principally described previously in connection with the first embodiment (cf. FIG. 2). On this way, only one, the relevant, vocabulary entry type specific acoustic phonetic transcription is performed. The selection of the resources is performed through a syllable language model selector 40 and an acoustic model selector 41, both controlled by the vocabulary entry type information 7.

Thereafter, vocabulary entries are set up in the compositor 9 as described above with reference to FIG. 4.

The technique according to the present invention has a number of applications, as for instance:

generating out of vocabulary (OOV) entries or adding new words for speech recognition lexicon, generating user-specific pronunciation lexicon from pre-recorded words for speech recognition or speech synthesis system, and updating voice directory of a mobile phone.

Additionally, the generic method of invention—together with a word boundary detector system—enables also automatic vocabulary generation from any public accessible acoustic data.

The invention claimed is:

1. A method for automatically generating a vocabulary entry from input acoustic data, said method comprising:
    performing, by a computer processor, a vocabulary entry type-specific acoustic phonetic transcription of the input acoustic data and a classification of vocabulary entry types based on phonetic structure, wherein the classification of vocabulary entries is carried out in accordance with a number of predetermined types;
    performing, by the computer processor, a vocabulary entry type-specific phoneme-to-grapheme conversion, to derive the respective vocabulary entries comprising a pair of the phonetic transcription of the input acoustic data and its grapheme form; and
    providing a select one of the vocabulary entries to a database for use in a speech processing application;
    wherein the classification of vocabulary entries is carried out together with the vocabulary entry type-specific acoustic phonetic transcription in a combined step.

2. The method according to claim 1, wherein syllable language modeling is applied during vocabulary entry type-specific acoustic phonetic transcription.

3. The method according to claim 1, wherein the vocabulary entry types are hypothesized during acoustic phonetic transcription, with separate acoustic phonetic transcription being applied for each hypothesized vocabulary entry type.

4. The method according to claim 1, wherein for automatic vocabulary entry type classification a neural network based language identification is applied.

5. The method according to claim 4, wherein at first, the neural network based classification is carried out, whereafter the acoustic phonetic transcription is performed on the basis of the vocabulary entry type information.

6. The method according to claim 1, wherein the vocabulary entries are classified according to four types, namely vocabulary entries fitting to a given language morphology; vocabulary entries fitting to morphology of at least one other supported language; vocabulary entries which do not fit to any supported language morphology but are normally pronounced; and vocabulary entries which do not fit to any supported language morphology and are pronounced by spelling.

7. The method according to claim 6, wherein a standard acoustic model is applied together with syllable language models with respect to vocabulary entries which fit to one of the supplied language morphologies, whereas a high resolution acoustic model is applied with respect to normal abbreviation type and a spelling acoustic model is applied with respect to spelled abbreviations.

8. A device for automatically generating a vocabulary entry from input acoustic data and comprising: a vocabulary entry type classifier that determines a vocabulary entry type based on a phonetic structure of the input acoustic data, and
    an acoustic phonetic transcriber that provides a phonetic sequence based on the input acoustic data and the vocabulary entry type, a vocabulary entry compositor that generates the vocabulary entry,
    wherein the vocabulary entry type classifier is arranged to classify the input acoustic data in accordance with a number of predetermined vocabulary entry types, and wherein the vocabulary entry compositor includes a statistical phoneme-to-grapheme converter that generates a grapheme based on the vocabulary entry type;

wherein the vocabulary entry type classifier includes gates for respective vocabulary entry types, the gates being arranged to output a respective vocabulary entry type information together with the phonetic transcription.

9. The device according to claim 8, wherein the acoustic phonetic transcriber includes at least one syllable language model.

10. The device according to claim 8, wherein the acoustic phonetic transcriber includes standard, high resolution and spelling acoustic model means.

11. The device according to claim 8, wherein the vocabulary entry type classifier includes a neural network that is arranged to output probability information for each predetermined vocabulary entry type together with the input acoustic data.

12. The device according to claim 8, wherein the acoustic phonetic transcriber includes an acoustic model selector associated with a plurality of acoustic models and a syllable language model selector associated with a plurality of syllable language models, both selectors being controlled at least in part by the vocabulary entry type.

13. A non-transitory computer readable medium that includes a computer program that comprises sections of software code for performing the method according to claim 1 when the computer program is executed on the computer.

14. A non-transitory computer readable medium that includes a program that, when executed by a processor, causes the processor to:
   determine a vocabulary entry type based on a phonetic structure of an input acoustic data,
   provide a phonetic sequence based on the input acoustic data and the vocabulary entry type, and
   generate a vocabulary entry based on a statistically determined grapheme based on the phonetic sequence and the vocabulary entry type,
   wherein determining the vocabulary entry type is determined from among a plurality of predetermined vocabulary entry types, and
   the plurality of predetermined vocabulary entry types includes a natural language entry type and an abbreviation entry type.

15. The medium of claim 14, wherein providing the phonetic sequence includes use of a standard acoustic model and a high resolution model, depending upon the determined vocabulary input type.

16. The medium of claim 14, wherein determining the vocabulary entry type includes hypothesizing each of the predetermined vocabulary entry types and a corresponding confidence level based on the phonetic sequence using each predetermined vocabulary entry type.

17. The medium of claim 14, wherein the determining of the vocabulary entry type includes providing a form of the input acoustic data to a neural network.

18. The medium of claim 14, wherein the providing of the phonetic sequence includes applying one or more acoustic models based on the vocabulary entry type.

19. A non-transitory computer readable medium that includes a program that, when executed by a processor, causes the processor to:
   determine a vocabulary entry type based on a phonetic structure of an input acoustic data,
   provide a phonetic sequence based on the input acoustic data and the vocabulary entry type, and
   generate a vocabulary entry based on a statistically determined grapheme based on the phonetic sequence and the vocabulary entry type,
   wherein determining the vocabulary entry type is determined from among a plurality of predetermined vocabulary entry types, and
   the providing of the phonetic sequence includes applying one of a plurality of acoustic models depending upon the vocabulary entry type.

20. The medium of claim 19, wherein the plurality of acoustic models include two or more of: a natural acoustic model, a high-resolution acoustic model, and a spelling acoustic model.

* * * * *